United States Patent
Boyer et al.

(10) Patent No.: US 6,894,858 B1
(45) Date of Patent: May 17, 2005

(54) READ EQUALIZER OPTIMIZATION BASED ON THE PTR EFFECTS TO WRITE EQUALIZATION

(75) Inventors: Keith Gary Boyer, Broomfield, CO (US); Mark A. Hennecken, Parker, CO (US)

(73) Assignee: Storage Technology Corporation, Louisville, CO (US)

( * ) Notice: Subject to any disclaimer, the term of this patent is extended or adjusted under 35 U.S.C. 154(b) by 290 days.

(21) Appl. No.: 10/213,621

(22) Filed: Aug. 6, 2002

(51) Int. Cl.[7] .............................. G11B 5/035; G11B 5/09
(52) U.S. Cl. .............................. 360/65; 360/46; 360/39; 360/55
(58) Field of Search ...................... 360/65, 46, 27–28, 360/53, 55, 39; 375/232, 262, 341, 229; 714/795

(56) References Cited

U.S. PATENT DOCUMENTS

| | | | | |
|---|---|---|---|---|
| 4,847,871 A | | 7/1989 | Matsushita et al. ............ 375/94 |
| 4,912,573 A | * | 3/1990 | Murabayashi et al. ......... 360/51 |
| 5,150,381 A | | 9/1992 | Forney, Jr. et al. ............ 375/39 |
| 5,606,466 A | | 2/1997 | Fisher et al. .................... 360/51 |
| 5,862,192 A | | 1/1999 | Huszar et al. ................. 375/347 |
| 5,949,820 A | * | 9/1999 | Shih et al. .................... 375/229 |
| 6,023,383 A | | 2/2000 | Glover et al. .................. 360/46 |
| 6,101,227 A | | 8/2000 | Glover ........................... 360/46 |
| 6,101,229 A | | 8/2000 | Glover ......................... 375/354 |
| 6,104,766 A | | 8/2000 | Coker et al. .................. 375/341 |
| 6,108,153 A | | 8/2000 | Glover ........................... 360/51 |
| 6,137,843 A | | 10/2000 | Chennakeshu et al. ..... 375/340 |
| 6,154,870 A | | 11/2000 | Fredrickson et al. ......... 714/786 |
| 6,201,831 B1 | | 3/2001 | Agazzi et al. ............... 375/229 |
| 6,201,839 B1 | | 3/2001 | Kavcic et al. ............... 375/341 |
| 6,282,045 B1 | | 8/2001 | Glover ..................... 360/73.03 |
| 6,378,107 B1 | * | 4/2002 | Yoshinaka .................. 714/795 |
| 6,400,288 B1 | | 6/2002 | Fredrickson et al. .......... 341/59 |
| 6,445,526 B1 | * | 9/2002 | Kobayashi et al. ........... 360/65 |
| 6,501,610 B1 | * | 12/2002 | Sugawara et al. ............ 360/65 |
| 6,724,555 B2 | * | 4/2004 | Ohta ............................. 360/65 |
| 2002/0006173 A1 | | 1/2002 | Agazzi et al. | |

FOREIGN PATENT DOCUMENTS

| JP | 62241111 A | * | 10/1987 | .................. 360/65 |
|---|---|---|---|---|

OTHER PUBLICATIONS

Kuhn, "Magnetic Recording—an Introduction", http://www.ee.washington.edu/conselec/CE/kuhn/magtape/95x1.htm, Jun. 27, 2002, pp. 1–15.

Zipperian et al., "On the Road to Increasing Areal Density", file:/A\Nick\C\veeco\veeco\html\body on the road.html, Nov. 8, 2000, pp. 1–5.

http://www-unix.ecs.umass.edu/~vthyagar/wireless/rep/conv.html, "Convoluational Encoding", Jul. 8, 2000, pp. 1–4.

* cited by examiner

*Primary Examiner*—Sinh Tran
*Assistant Examiner*—Natalia Figueroa
(74) *Attorney, Agent, or Firm*—Yee & Associates, P.C.

(57) ABSTRACT

A system and method for decoding magnetic media. Parallel decoders, each with a different equalization magnitude, are used to decode a read signal. A Viterbi metric is used to determine the direction and magnitude of equalization shift that best compensates for a systematic separation, such as pole tip recession. If optimal equalization has changed, the equalization coefficients of the decoders is shifted to compensate.

16 Claims, 2 Drawing Sheets

READ EQUALIZER OPTIMIZATION BASED ON THE PTR EFFECTS TO WRITE EQUALIZATION

BACKGROUND OF THE INVENTION

1. Field of the Invention

The present innovations relate to magnetic recording. More particularly, an innovative adaptive equalization system and method is disclosed.

2. Background of the Invention

Storage technology, particularly magnetic storage, is driven by a need to increase storage density and reduce the size of storage hardware. As storage density increases and size decreases, the tolerances for reading and writing data become more strict. Data density is ultimately driven by limitations of minimizing the length and width of the transition signal at the media.

When certain data patterns occur during high-density data recording on magnetic media, non-linear bit shifts arise. These bit shifts are primarily caused by demagnetization effects, i.e., as a result of the fact that the magnetic medium 'opposes' the recording of a change of sign in the bit stream, particularly when a plurality of bits of the same sign precede one bit of an opposite sign. This effect manifests itself in that a change of sign or transition is recorded too late or too early, which results in bits being recorded which are too short or too long, respectively.

The article "Write current equalization for high speed digital magnetic recording" by T. Kato, R. Arai and S. Takanami in IEEE Trans. Magn., Vol. MAG-22, No. 5, pp. 1212–1214, September 1986, describes the problem of non-linear bit shifts as a result of the limited bandwidth of the recording channel, particularly as a result of the self-inductance of the write head.

Write equalization adds short duration pulses to the write current, each of which consists of two transitions. The added pulses have too short a wavelength to be resolved during readback. Their effect is to slim readback pulses resulting from data 1 transitions. This enhances the performance of certain peak detect and PRML channels.

As size decreases, new sources of magnetic spacing loss arise. Pole tip recession (PTR) is one such source. As flying heights reach near-contact levels, variations in PTR may represent a significant fraction of the total distance between the read/write head and the magnetic media.

Magnetic recording systems that use write equalization experience significant variation in the overall equalization due to the effects of PRT. The high-density transitions written in order to accomplish the write equalizer transfer function become the shortest wavelengths of the system. Hence, they are the most sensitive to variations in separation between the head and the tape. PTR differs from the normal variation in separation because it changes slowly over the life of the product, or is at least constant for each region of a tape written by a specific system. The normal head to media separation variation experienced while recording needs to be accounted for with a method such as parallel decoders with separate equalization or adaptation such as LMS (Least Mean Squared). However, parallel decoders with separate equalization in its optimal configuration may not span the necessary frequency variation, and implementing LMS can be costly. LMS options also are less desirable because of their delayed response time in a decoding scheme.

The current technology of magnetic recording would therefore benefit from an effective means to overcome PTR or other systematic variations.

SUMMARY OF THE INVENTION

The present invention describes an improvement to magnetic recording systems. In a preferred embodiment, a systematic spacing variation (such as PTR) is overcome using a set of decoders. Each decoder applies a different unique equalization to the read signal, so that one of the plurality will provide an optimal equalization, at least compared to the other decoders.

In a preferred embodiment, the result of the decoders is analyzed by a Viterbi metric or other mean squared error (MSE) algorithm. The Viterbi Distance or LMS estimate (whatever best fit algorithm is used) from each channel can tell the system which direction the PTR (or other variation) has shifted, and hence which magnitude of equalization the plurality of decoders will shift to. Hence, the innovative system responds to unknown variation in the read signal and determines what frequency shift is most appropriate for decoding. This frequency shift is implemented by choosing the equalization or the set of equalizers that best match the needed frequency shift.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present innovations are described with reference to the figures.

Figure 1:
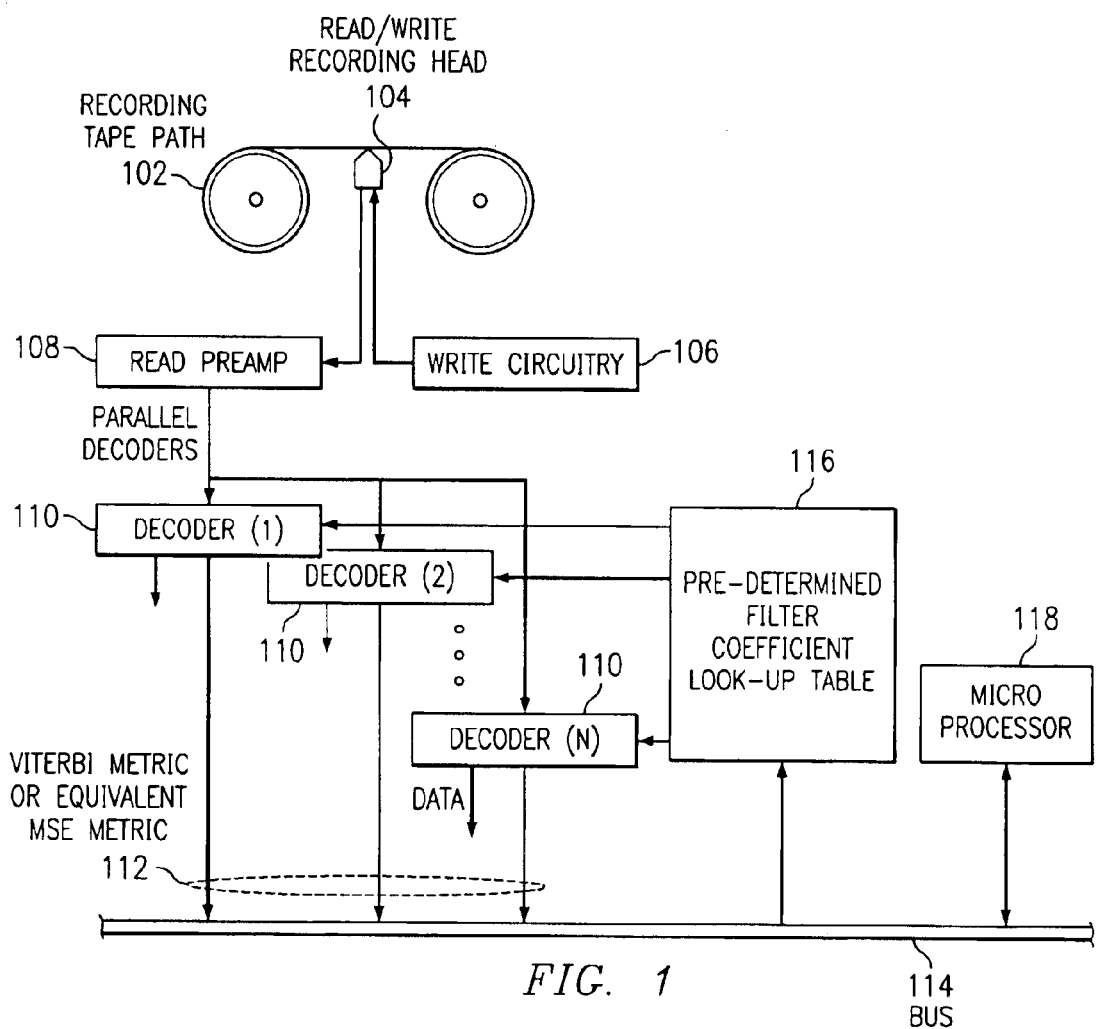
FIG. 1 shows a block diagram of an innovative system consistent with a preferred embodiment.

FIG. 1 shows an example implementation of a preferred embodiment. Magnetic recording medium (a tape in this example) 102 is passed over read/write recording head 104. Read/write head 104 is connected to write circuitry 106 which controls head 104 when it is used to record onto magnetic medium 102. Head 104 also connects to read preamp 108, which forwards the read signals to parallel decoders 110. Decoders 110 perform equalization functions and, in a preferred embodiment, each has a unique transfer function, $g_x(\omega)$, having a range of magnitudes or degrees of equalization which is applied to the read signal. Each decoder 110 comprises one of a plurality of parallel "channels" for decoding the read signal.

Decoders 110 are each provide Viterbi metrics 112 or equivalent MSE (Mean Squared Error) metric. Preferably both Viterbi metric 112 and the decoders 110 are operably connected to bus 114. Bus 114 is also accessible to Pre-Determined Filter Coefficient Look-Up Table 116. Bus 114 is also connected to microprocessor 118.

In this example of a preferred embodiment, each decoder is capable of applying a range of equalization to the signal.

Each decoder can have a different range of equalization which it can apply so that a range of needed equalization can be obtained if the proper decoder is used. As depicted, the decoders operate in parallel. Alternatively, each decoder can have the same range of equalization which it is capable of applying, with the actual applied equalization being determined as described below. In a preferred embodiment, the decoders each apply a different equalization so that a wide range of equalization is simultaneously applied (via the parallel channels) to the read signal.

In the case of a magnetic medium written with write equalization, PTR can be a significant factor because the wavelength of the pulses added via write equalization are small compared to the data signal wavelengths. Therefore the write equalization signal is more susceptible to the degree of variation caused by PTR.

Knowing the shift in write equalization, it is possible to specify the optimal equalizer for any level of PTR. Though the example of PTR is used throughout this disclosure, this shift due to separation could of course be any characteristic function that is systematically understood. However, in the case of spacing loss we know that the recording suffers as function of wavelength according to Equation 1:

$$h_d(\omega) = e^{-\omega d} = e^{-2\pi d/\lambda}$$

FIG. 1 shows a system with N parallel decoders. As stated above, each of the N decoders has a unique transfer function $g_x(\omega)$, each having a range of magnitudes. From Equation 1 we can determine the needed transfer function depending on the separation according to Equation 2:

$$G_x(\omega) = g_x(\omega) * 1/h_d(\omega)$$

Any number of equalizer families can then be generated from one set of optimized equalizers using Equation 2. Hence, any degree of PTR or other systematic separation can be compensated for selectively by choosing the proper decoder 110.

In a preferred embodiment, the Viterbi Distance or MSE estimate from each decoder can tell the system which direction the PTR has shifted, and hence which level of compensation to engage. This provides a simple system for shifting the equalizer space. The estimate of the best decoder is determined by the Viterbi metric 112, or equivalent MSE. Since the plurality of decoders spans a range of equalization, that range can dictate the direction that the required equalization has shifted.

After the most accurate or optimal degree of frequency shift is determined (i.e., which decoder best decoded the read signal), this information is used to access the Pre-Determined Filter Coefficient Look-Up Table as indicated in FIG. 1. The filter coefficients (i.e., the degrees of equalization applied by each decoder) are then shifted so that the plurality of decoders are centered (in equalization space) on the optimal amount of equalization. For example, if there are 5 decoders each applying different equalization, and the fourth decoder is found to be optimal, then the equalization of all five decoders is preferably shifted similar amounts so that the third (i.e., the middle) decoder is centered on the optimal equalization. This allows both a wide range of equalization to be applied to the read signal, and the ability to shift that range of equalization in equalizer space so that, overall, the group of equalizations centers on the optimal equalization. This is useful, for example, because as tape moves past the read head, vibrations or other small movements can change the distance between the head and the tape. This change in distance can require different equalization for decoding. Having a range of equalizers which can each dynamically shift their filter coefficients allows for compensation for such movement.

In a preferred embodiment, the Viterbi metric determines which decoder of the plurality is set at the optimal equalization and forwards this information to microprocessor 118. Microprocessor 18 then controls Coefficient Lookup Table 116 so that the Table causes all the decoders to shift equalizer space. This recenters the family of equalizers so that the central equalizer is centered on the optimal frequency shift, preferably shifting the other decoders in a relative amount so that together they span the same range of equalizer space as previously. As before the shift, in a preferred embodiment each decoder still applies different equalization relative to one another. The distribution of equalization between the decoders is preferably such that a wide range of equalization is applied to the read signal—i.e., a different range is applied by each decoder. Thus, the family of decoders provides a wide range and variable range of equalization to the read signal. The $G_x(\omega)$ term of Equation 2 is analogous to an entry in Lookup Table 116.

It should be noted that although a mean squared estimate is referred to when determining the most efficient decoder, other methods of determining the best decoder are equally applicable to the present innovations.

Figure 2:
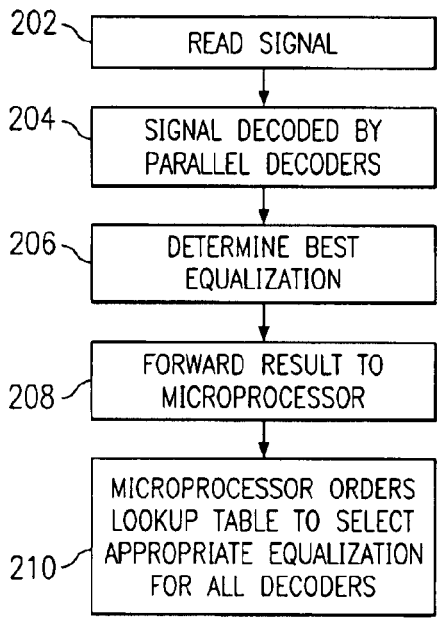
FIG. 2 shows a flow chart of process steps for implementing the present innovations.

FIG. 2 shows a process for implementing a preferred embodiment. First, the signal is read (step 202). The read signal is decoded by a plurality of parallel decoders (step 204). The Viterbi metric then determines which direction of frequency shift or equalization best improves decoding (step 206). This information is forwarded to the microprocessor (step 208) which orders the Lookup Table to shift the equalization of the decoders, recentering all the decoders in equalization space so that the central decoder of the plurality applies optimal equalization (step 210).

Figure 3:
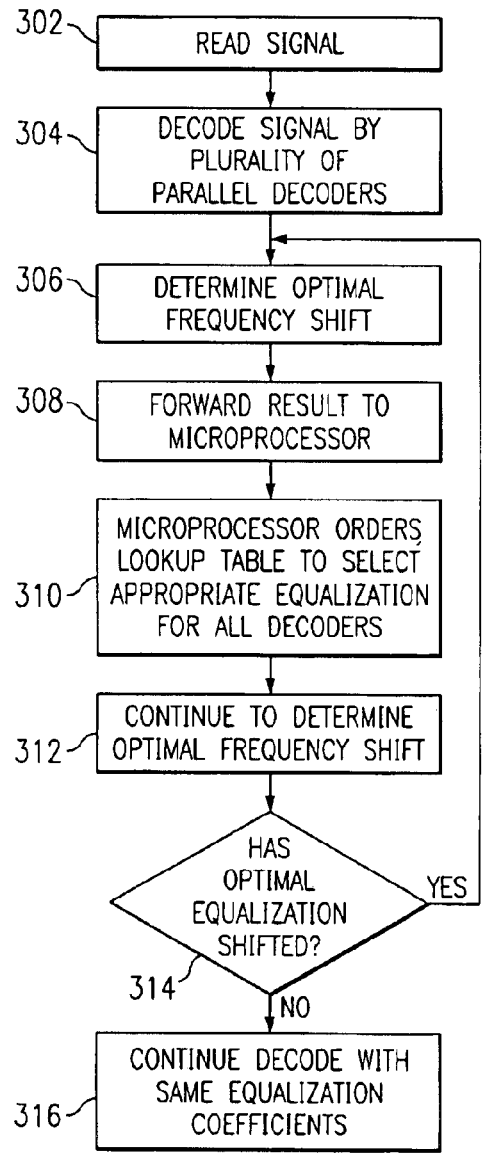
FIG. 3 shows another flow chart of process steps for implementing the present innovations.

FIG. 3 shows another process flow for implementing a preferred embodiment. A read signal is read (step 302) and decoded by a plurality of decoders (step 304). The Viterbi metric then determines which direction of frequency shift or equalization best improves decoding (step 306). This information is forwarded to the microprocessor (step 308) which orders the Lookup Table to select the appropriate equalization coefficients for the decoders from the plurality (step 310), which changes the equalization of each of the decoders. The Viterbi metric continues measuring which decoder of the plurality best decodes the signal (step 312) and if there is a change in the signal such that a different decoder produces the best equalization (step 314) then the metric causes the equalization of the decoders to shift again, recentering the decoders in equalization space over the new optimal equalization. If there is no change in the signal that causes the optimal equalization to shift, then the signal continues to be decoded using the same equalization in the decoders (step 316).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for accessing data from a magnetic medium, comprising:
   a plurality of decoders connected in parallel to decode a signal read from the magnetic medium, at least two of the decoders applying different read equalization to the signal to optimize read equalization based on the pole tip recession effects of the write equalization;
   means for determining which decoder of the plurality best decoded the signal.

2. The system of claim 1, further comprising a lookup table, wherein the means for determining creates a result, and wherein the result determines the equalization applied by at least one of the decoders of the plurality.

3. The system of claim 2, wherein the means for determining forwards the result to a microprocessor and wherein the microprocessor causes the lookup table to select equalization coefficients for at least one decoder of the plurality.

4. The system of claim 1, wherein the means for determining comprise a Viterbi metric.

5. The system of claim 1, wherein the decoders of the plurality each apply a different read equalization to the read signal;
   wherein a first decoder of the plurality applies an equalization closest to an optimal read equalization; and
   wherein if the optimal read equalization changes, the read equalization of each of the decoders is shifted to compensate for the change in optimal read equalization.

6. The system of claim 1, wherein a mean square error estimate is used to determine which decoder of the plurality best decoded the signal.

7. A system for reading data from a magnetic medium, comprising:
   a signal read from the magnetic medium, wherein the read signal has an optimal equalization for its decoding;
   first and second decoders connected to apply equalization to the read signal, the first decoder applying a first equalization, the second decoder applying a second equalization;
   an algorithm which estimates a degree of success of the first and second decoders in decoding the read signal;
   wherein if the optimal equalization changes, the first and second equalizations are changed by a like magnitude and direction; wherein the change in optimal equalization is caused by pole tip recession.

8. The system of claim 7, further comprising a lookup table containing coefficients, wherein application of the coefficients to the decoders controls the equalization which they apply.

9. The system of claim 7, wherein the degree of success is measured by a mean square error estimate.

10. The system of claim 7, wherein the algorithm is a Viterbi metric.

11. A method for reading a magnetic medium, comprising the steps of:
    reading a signal from the magnetic medium with a plurality of decoders in parallel, each decoder of the plurality applying a different equalization to the read signal such that a first range of equalization is spanned by the decoders;
    detecting a shift in the optimal equalization for decoding the read signal, wherein the shift in the optimal equalization is caused by the pole tip recession;
    shifting the equalization of each of the plurality of decoders such that a second range of equalization is spanned by the decoders.

12. The method of claim 11, wherein the step of shifting the equalization shifts the equalization by an amount consistent with the shift in the optimal equalization.

13. The method of claim 11, wherein the step of detecting a shift in the optimal equalization for decoding the read signal is performed by comparing mean square error estimates of each decoder of the plurality.

14. A method of decoding a signal from a magnetic medium, comprising the steps of:
    decoding a read signal using a plurality of parallel decoders, each of the decoders applying a different equalization to the signal;
    detecting a shift in the optimal equalization based on which decoder of the plurality best decodes the signal;
    shifting the equalization of all decoders of the plurality to compensate for the shift in optimal equalization, wherein the step of shifting the equalization shifts the equalization by an amount and in a direction consistent with the shift in the optimal equalization wherein the shift in the optimal equalization is caused by pole tip recession.

15. The method of claim 14, wherein the step of detecting a shift in the optimal equalization is performed by comparing mean square error estimates of each decoder of the plurality.

16. A method of decoding a signal from a magnetic medium, comprising the steps of:
    decoding a read signal using a plurality of parallel decoders, each of the decoders applying a different equalization to the signal;
    detecting a shift in the optimal equalization based on which decoder of the plurality best decodes the signal;
    shifting the equalization of all decoders of the plurality to compensate for the shift in optimal equalization, wherein the shift in optimal equalization is caused by pole tip recession.

* * * * *